US009825746B2

(12) United States Patent
Chung et al.

(10) Patent No.: US 9,825,746 B2
(45) Date of Patent: *Nov. 21, 2017

(54) CONTROL INFORMATION TRANSMISSION METHOD AND A DEVICE THEREFOR

(71) Applicant: LG ELECTRONICS INC., Seoul (KR)

(72) Inventors: Jae Hoon Chung, Anyang-si (KR); Hyun Woo Lee, Anyang-si (KR); Young Hyoun Kwon, Anyang-si (KR); Ji Woong Jang, Anyang-si (KR); Seung Hee Han, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/407,919

(22) Filed: Jan. 17, 2017

(65) Prior Publication Data

US 2017/0126386 A1 May 4, 2017

Related U.S. Application Data

(63) Continuation of application No. 15/053,775, filed on Feb. 25, 2016, now Pat. No. 9,577,809, which is a (Continued)

(51) Int. Cl.
*H04L 12/24* (2006.01)
*H04L 5/00* (2006.01)
(Continued)

(52) U.S. Cl.
CPC .............. *H04L 5/0055* (2013.01); *H04L 1/16* (2013.01); *H04L 1/1607* (2013.01);
(Continued)

(58) Field of Classification Search
None
See application file for complete search history.

(56) References Cited

U.S. PATENT DOCUMENTS

2009/0170443 A1  7/2009  Obuchi et al.
2009/0196366 A1  8/2009  Shen et al.
(Continued)

FOREIGN PATENT DOCUMENTS

CN  101364838 A  2/2009
CN  101471751 A  7/2009
(Continued)

OTHER PUBLICATIONS

Author Unknown, R1-081816, Submission to 3GPP TSG RAN Workgroup 1, May 9, 2008, pp. 1-6.
(Continued)

*Primary Examiner* — Christopher Crutchfield
(74) *Attorney, Agent, or Firm* — Birch, Stewart, Kolasch & Birch, LLP

(57) ABSTRACT

A method for receiving ACK/NACK (Acknowledge/Negative ACK) information at a base station in a wireless communication system, the method includes configuring a plurality of carriers for downlink signal transmission; transmitting downlink signals including a semi-persistent scheduled downlink signal through the plurality of carriers; and receiving an ACK/NACK payload for the plurality of carriers, the ACK/NACK payload including a plurality of concatenated ACK/NACK sets, wherein each ACK/NACK set is associated with a respective one of the plurality of carriers and has one or more ACK/NACK bits, wherein the ACK/NACK payload includes an ACK/NACK bit for the semi-persistent scheduled downlink signal, and the ACK/NACK bit for the semi-persistent scheduled downlink signal is positioned at an end of a corresponding ACK/NACK set.

16 Claims, 14 Drawing Sheets

Related U.S. Application Data continuation of application No. 14/657,917, filed on Mar. 13, 2015, now Pat. No. 9,306,706, which is a continuation of application No. 13/583,815, filed as application No. PCT/KR2011/002277 on Apr. 1, 2011, now Pat. No. 9,118,470.

(60) Provisional application No. 61/320,276, filed on Apr. 1, 2010.

(51) Int. Cl.
    *H04W 72/04* (2009.01)
    *H04L 1/16* (2006.01)

(52) U.S. Cl.
    CPC .......... *H04L 1/1614* (2013.01); *H04W 72/04* (2013.01); *H04W 72/042* (2013.01); *H04W 72/0413* (2013.01)

(56) References Cited

U.S. PATENT DOCUMENTS

| | | |
|---|---|---|
| 2009/0232119 A1 | 9/2009 | Seok |
| 2009/0241004 A1 | 9/2009 | Ahn et al. |
| 2009/0290538 A1 | 11/2009 | Kim et al. |
| 2010/0027511 A1 | 2/2010 | Terry |
| 2010/0150081 A1 | 6/2010 | Gao et al. |
| 2010/0159981 A1* | 6/2010 | Chiang .................. G06F 3/017 455/556.1 |

FOREIGN PATENT DOCUMENTS

| | | |
|---|---|---|
| CN | 101499882 A | 8/2009 |
| WO | WO 2010/016698 A2 | 2/2010 |

OTHER PUBLICATIONS

Huawei, "PUCCH design for carrier aggregation", 3GPP TSG RAN WG1 Meeting #58bis, R1-093838, Miyazaki, Japan, Oct. 12-16, 2009, 6 pages.

LG Electronics, "ACK/NACK PUCCH for LTE-Advanced," 3GPP TSG RAN WG1 Meeting #58, R1-093251, Shenzhen, China, Aug. 24-28, 2009, pp. 1-6.

ZTE, "Bundling way for format 1b with channnel selection in LTE-A TDD", 3GPP TSG RAN WG1 Meeting #63, R1-106444, Jacksonville, USA, Nov. 15-19, 2010, pp. 1-6.

* cited by examiner

Structure of PUCCH formats 1a and 1b (Normal CP case)

Structure of PUCCH formats 1a and 1b (Extended CP case)

Structure of PUCCH formats 2, 2a, and 2b (Normal CP case)

Structure of PUCCH formats 2, 2a, and 2b (Normal CP case)

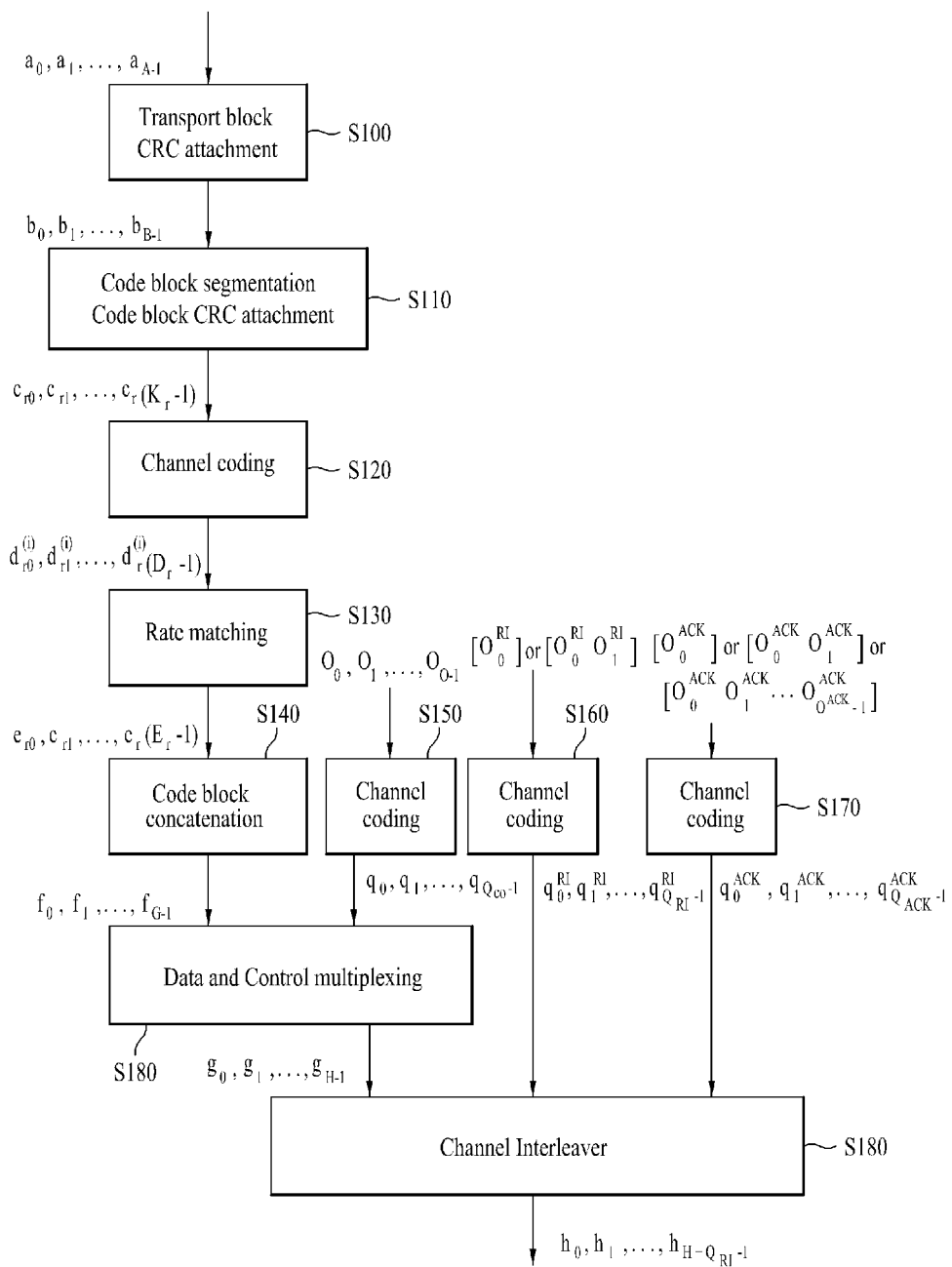

FIG. 12
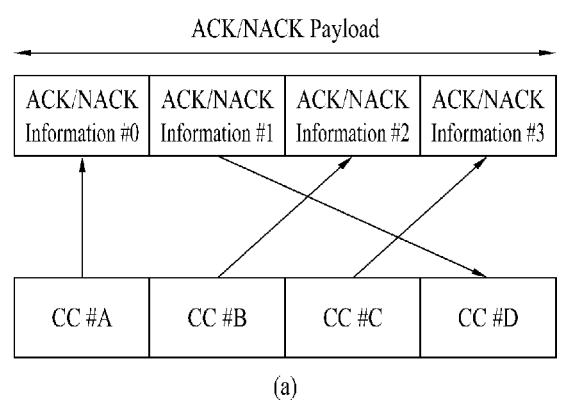
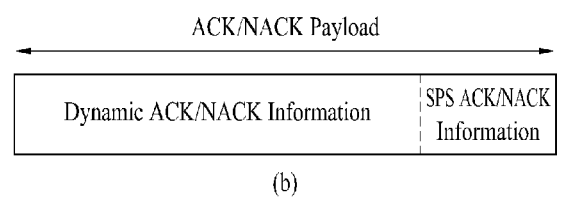

CONTROL INFORMATION TRANSMISSION METHOD AND A DEVICE THEREFOR

CROSS-REFERENCES TO RELATED APPLICATIONS

This Application is a Continuation of co-pending U.S. patent application Ser. No. 15/053,775 filed on Feb. 25, 2016, which is a Continuation of U.S. patent application Ser. No. 14/657,917 filed on Mar. 13, 2015 (now U.S. Pat. No. 9,306,706 issued on Apr. 5, 2016), which is a Continuation of U.S. patent application Ser. No. 13/583,815 filed on Sep. 10, 2012 (now U.S. Pat. No. 9,118,470 issued on Aug. 25, 2015), which is filed as the National Phase of PCT/KR2011/002277 filed on Apr. 1, 2011, which claims the benefit under 35 U.S.C. §119(e) to U.S. Provisional Application No. 61/320,276 filed on Apr. 1, 2010, all of which are hereby expressly incorporated by reference into the present application.

BACKGROUND OF THE INVENTION

Field of the Invention

The present invention relates to a wireless communication system, and more particularly, to a method and apparatus for transmitting control information.

Discussion of the Related Art

Wireless communication systems have been extensively developed to provide various types of communication services such as a voice or data service. Generally, a wireless communication system refers to a multiple access system capable of supporting communication with multiple users by sharing available system resources (bandwidth, transmit power, etc.). The multiple access system includes, for example, a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, a Multi Carrier Frequency Division Multiple Access (MC-FDMA) system, etc.

SUMMARY OF THE INVENTION

It is an object of the present invention to provide a method and apparatus for efficiently transmitting control information in a wireless communication system. It is another object of the present invention to provide a method and apparatus for efficiently transmitting multiple ACK/NACK information. It is still another object of the present invention to provide a method and apparatus for efficiently piggybacking multiple ACK/NACK information on an uplink shared channel.

It will be appreciated by persons skilled in the art that that the technical objects that can be achieved through the present invention are not limited to what has been particularly described hereinabove and other technical objects of the present invention will be more clearly understood from the following detailed description.

According to one aspect of the present invention, A method for transmitting ACK/NACK(Acknowledge/Negative ACK) by an user equipment in a wireless communication system which supports carrier aggregation, the method comprising of: receiving one or more data simultaneously on a plurality of carriers; generating an ACK/NACK payload, the ACKJNACK payload containing one or more ACK/NACK information for the one or more data; and transmitting the ACK/NACK payload, wherein each position of ACK/NACK information in the ACK/NACK payload, is corresponding to each carrier.

According to other aspect of the present invention, An user equipment for transmitting ACK/NACK (Acknowledge/Negative ACK) in a wireless communication system which supports carrier aggregation, the apparatus comprising: a radio frequency unit; and a processor, wherein the processor is configured to receive one or more data simultaneously on a plurality of carriers, to generate ACK/NACK payload, the ACK/NACK payload containing one or more ACK/NACK information for the one or more data, and to transmit the ACK/NACK payload, wherein each position of ACK/NACK information in the ACK/NACK payload is corresponding to each carrier.

Preferably, each of ACK/NACK information is generated per carrier, and the ACK/NACK payload includes ACK/NACK information of whole configured carriers.

Preferably, each position of ACK/NACK information in the ACK/NACK payload is determined by using carrier index order.

Preferably, the method may further include receiving PDCCH(Physical Downlink Control Channel) related to semi-persistent scheduling in a same sub-frame with the one or more data; wherein ACK/NACK information related to the PDCCH, is located in an end of the ACK/NACK payload.

Preferably, the method may further include Receiving PDCCH related to semi-persistent scheduling in a same sub-frame with the one or more data; wherein ACK/NACK information for PDSCH(Physical Downlink Control Channel) transmission in the ACK/NACK payload is located per a downlink cell according to carrier index order for transmitting PDSCH, wherein the ACK information related to PDCCH is located in an end of a plurality of ACK information in corresponding downlink cell.

Preferably, the ACK/NACK payload is transmitted via a PDSCH(Physical Uplink Shared Channel).

According to the present invention, control information can be efficiently transmitted in a wireless communication system. In addition, multiple ACK/NACK information can be efficiently piggybacked on data. Furthermore, multiple ACK/NACK information can be efficiently piggybacked on an uplink shared channel.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included as a part of detailed description to provide a further understanding of the invention, illustrate embodiments of the invention and together with the description serve to explain the technical principle of the invention.

In the drawings:

FIG. 7 illustrates a process of processing UL-SCH data and control information;

FIGS. 11 to 13 illustrates exemplary ACK/NACK transmission according to an embodiment of the present invention.

DETAILED DESCRIPTION OF THE INVENTION

The following technology can be used for a variety of radio access techniques, for example, CDMA, FDMA, TDMA, OFDMA, SC-FDMA, and MC-FDMA. CDMA may be embodied through radio technology such as Universal Terrestrial Radio Access (UTRA) or CDMA2000. TDMA may be embodied through radio technology such as Global System for Mobile communications (GSM)/General Packet Radio Service (GPRS)/Enhanced Data Rates for GSM Evolution (EDGE). OFDMA may be embodied through radio technology such as IEEE 802.11 (Wi-Fi), IEEE 802.16 (WiMax), IEEE 802-20, and Evolved UTRA (E-UTRA). UTRA is a part of the Universal Mobile Telecommunications System (UMTS). 3rd Generation Partnership Project (3GPP) Long Term Evolution (LTE) is a part of Evolved UMTS (E-UMTS) which uses E-UTRA. LTE-Advanced (LTE-A) is an evolved version of 3GPP LTE.

To clarify description, although 3GPP LTE/LTE-A is mainly described, the technical sprit of the present invention is not limited thereto. In addition, specific terms used in the following description are provided to aid in understanding the present invention and such specific terms may be modified in other forms without departing from the technical sprit of the present invention.

Figure 1:
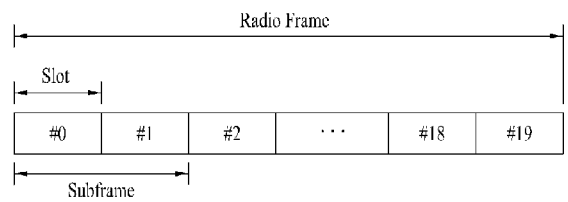
FIG. 1 illustrates the structure of a radio frame.

FIG. 1 illustrates the structure of a radio frame.

Referring to FIG. 1, a radio frame includes 10 subframes. Each subframe includes two slots in the time domain. A time for transmitting a subframe is defined as a Transmission Time Interval (TTI). For example, one subframe may have a length of 1 ms and one slot may have a length of 0.5 ms. One slot includes a plurality of Orthogonal Frequency Division Multiplexing (OFDM) or Single Carrier Frequency Division Multiple Access (SC-FDMA) symbols in the time domain. In an LTE system, OFDM symbols are used on a downlink (DL) and SC-FDMA symbols are used on an uplink (UL) and thus OFDM or SC-FDMA symbols denote one symbol duration. A Resource Block (RB) is a resource allocation unit and includes a plurality of consecutive subcarriers. The structure of the radio frame shown in FIG. 1 is purely exemplary and various modifications may be made in the number of subframes included in the radio frame, the number of slots included in the subframe, or the number of symbols included in the slot.

Figure 2:
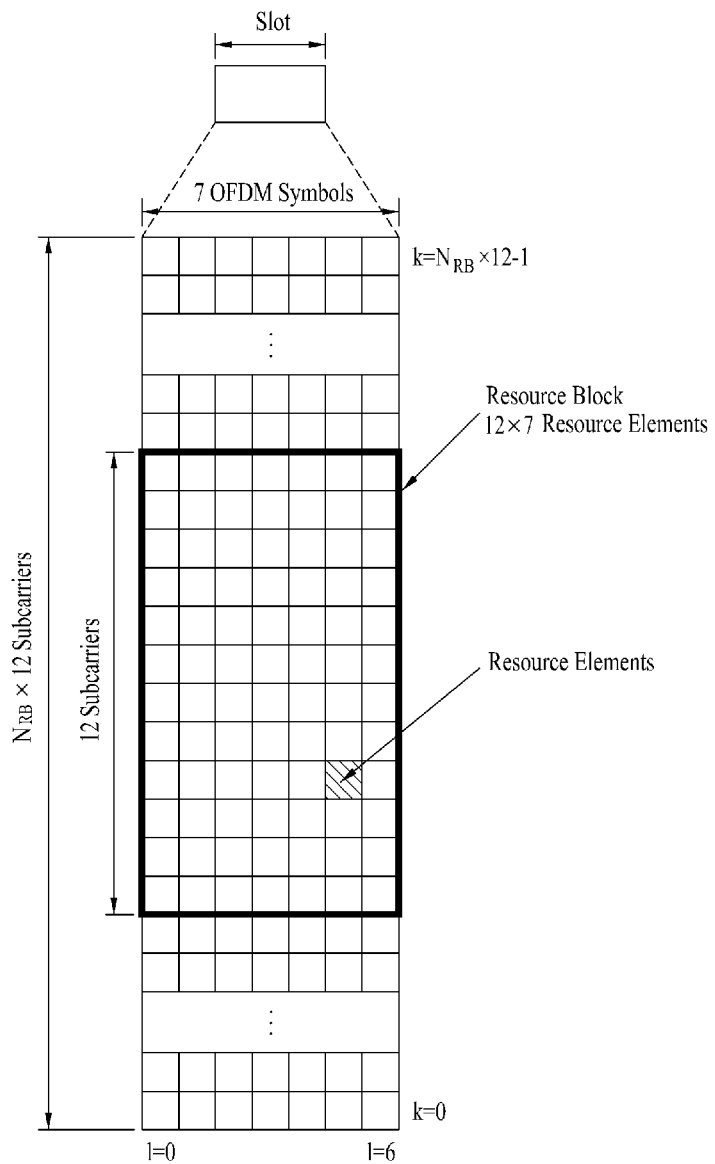
FIG. 2 illustrates a resource grid for a downlink slot.

FIG. 2 illustrates a resource grid for a DL slot.

Referring to FIG. 2, a DL slot includes a plurality of OFDM symbols in the time domain. One DL slot may include 7 (or 6) OFDM symbols and an RB may include 12 subcarriers in the frequency domain. Each element on a resource grid is referred to a Resource Element (RE). One RB includes 12×7 (or 6) REs. The number of RBs included in a DL slot, NRB, depends on DL transmission band. The structure of a UL slot is identical to the structure of the DL slot except that OFDM symbols are replaced with SC-FDMA symbols.

Figure 3:
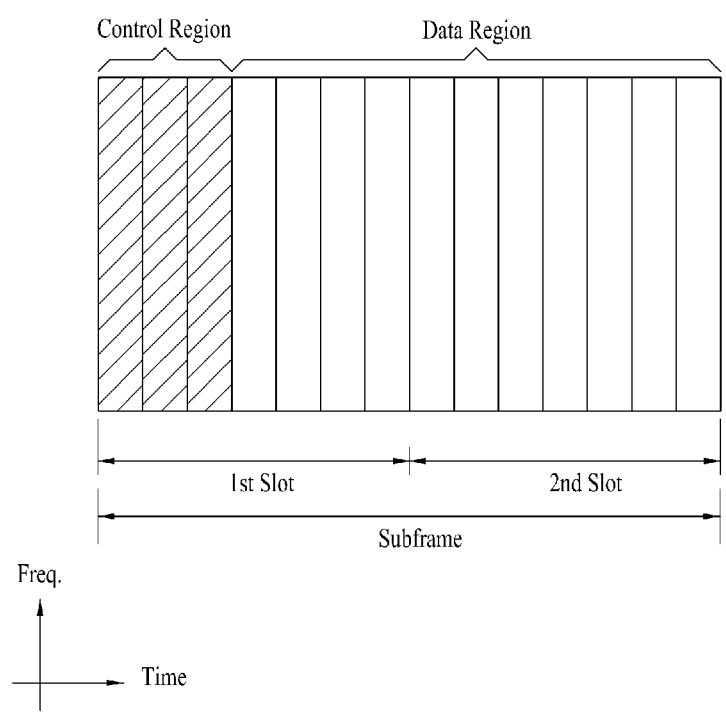
FIG. 3 illustrates the structure of a downlink subframe.

FIG. 3 illustrates the structure of a DL subframe.

Referring to FIG. 3, a maximum of 3 (or 4) OFDM symbols in the front portion of the first slot of a subframe corresponds to a control region to which a control channel is allocated and the remaining OFDM symbols correspond to a data region to which a Physical Downlink Shared Channel (PDSCH) is allocated. Control channels used in LTE include a Physical Control Format Indicator Channel (PCFICH), a Physical Downlink Control Channel (PDCCH), and a Physical Hybrid automatic repeat request Indicator Channel (PHICH). The PCFICH is transmitted on the first OFDM symbol of the subframe and carries information about the number of OFDM symbols used for control channel transmission in the subframe. The PHICH carries a Hybrid Automatic Repeat reQuest Acknowledgment/Negative-Acknowledgment (HARQ ACK/NACK) signal as a response to UL transmission.

Control information transmitted through the PDCCH is referred to as Downlink Control Information (DCI). The DCI includes resource allocation information for a User Equipment (UE) or a UE group and other control information. For example, the DCI includes UL/DL scheduling information, a UL transmit (Tx) power control command, etc.

The PDCCH carries a transmission format and resource allocation information for a Downlink Shared Channel (DL-SCH), a transmission format and resource allocation information for an Uplink Shared Channel (UL-SCH), paging information on a Paging Channel (PCH), system information on the DL-SCH, resource allocation information of a higher-layer control message such as a random access response transmitted on the PDSCH, a Tx power control command set for individual UEs in a UE group, a Tx power control command, activation indication information of Voice over IP (VoIP), and the like. A plurality of PDCCHs may be transmitted in the control region. A UE may monitor a plurality of PDCCHs. The PDCCH is transmitted on an aggregate of one or plural consecutive Control Channel Elements (CCEs). A CCE is a logical allocation unit used to provide the PDCCH with a coding rate based on a radio channel state. The CCE corresponds to a plurality of Resource Element Groups (REGs). A format of the PDCCH and the number of bits of the PDCCH are determined according to the number of CCEs. A Base Station (BS) determines a PDCCH format according to DCI to be transmitted to a UE and attaches a Cyclic Redundancy Check (CRC) to control information. An identifier (e.g. Radio Network Temporary Identifier (RNTI)) is masked to the CRC according to the owner or purposes of the PDCCH. For example, if the PDCCH is dedicated to a specific UE, an identifier of the UE (e.g. cell-RNTI (C-RNTI)) may be masked to the CRC. If the PDCCH is dedicated to a paging message, a paging identifier (e.g. paging-RNTI (P-RNTI)) may be masked to the CRC. If the PDCCH is for system information (more specifically, a System Information Block (SIB)), a System Information RNTI (SI-RNTI) may be masked to the CRC. If the PDCCH is for a random access response, a Random Access RNTI (RA-RNTI) may be masked to the CRC.

Figure 4:
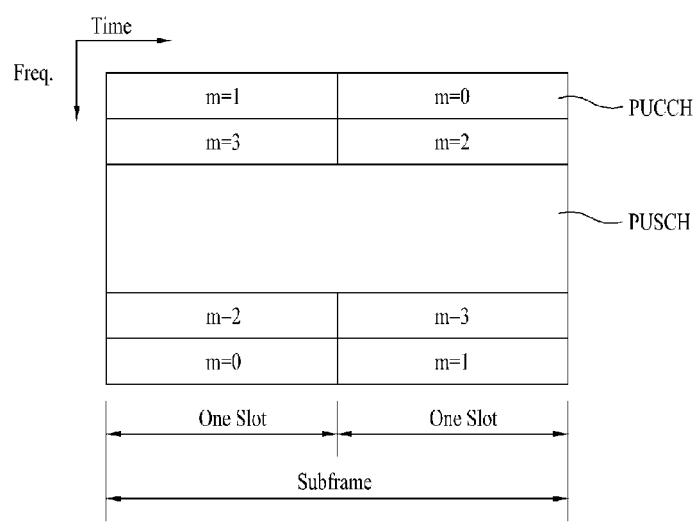
FIG. 4 illustrates the structure of an uplink subframe.

FIG. 4 illustrates the structure of a UL subframe used in LTE.

Referring to FIG. 4, a UL subframe includes plural (e.g. two) slots. Each slot may include a different number of SC-FDMA symbols according to the length of a Cyclic Prefix (CP). The UL subframe is divided into a data region and a control region in the frequency domain. The data region includes a PUSCH and is used to transmit data signals such as voice signals. The control region includes a PUCCH and is used to transmit Uplink Control Information (DCI). The PUCCH includes an RB pair located at both ends of the data region in the frequency domain and is hopped using the slot as a boundary.

FIGS. 5A, 5B, 6A, and 6B illustrate slot level structures of PUCCH formats. A PUCCH includes the following formats in order to carry control information.

(1) Format 1: used for On-Off Keying (OOK) modulation and a Scheduling Request (SR) for UL-SCH resources (2) Format 1a and Format 1b: used for ACK/NACK transmission as a response to a DL data packet on a PDSCH 1) Format 1a: BPSK ACK/NACK for one codeword 2) Format 1b: QPSK ACK/NACK for two codewords (3) Format 2: used for QPSK modulation and Channel Quality Information (CQI) transmission. CQI refers to feedback information for a DL channel. Multiple Input Multiple Output (MIMO)-related feedback information includes a Rank Indicator (RI) and a Precoding Matrix Indicator (PMI). 20 bits are used per subframe.

(4) Format 2a and format 2b: used for concurrent transmission of CQI and ACK/NACK Table 1 shows a mapping relationship between a PUCCH format and UCI in LTE. Table 2 shows a modulation scheme and the number of bits per subframe according to PUCCH formats. Table 3 shows the number of RSs per slot according to PUCCH format. Table 4 shows an SC-FDMA symbol location of an RS according to PUCCH format. In Table 2, PUCCH formats 2a and 2b correspond to a normal CP.

TABLE 1

| PUCCH Format | Uplink Control Information (UCI) |
|---|---|
| Format 1 | Scheduling request (SR) (unmodulated waveform) |
| Format 1a | 1-bit HARQ ACK/NACK with/without SR |
| Format 1b | 2-bit HARQ ACK/NACK with/without SR |
| Format 2 | CQI (20 coded bits) |
| Format 2 | CQI and 1- or 2-bit HARQ ACK/NACK (20 bits) for extended CP only |
| Format 2a | CQI and 1-bit HARQ ACK/NACK (20 + 1 coded bits) |
| Format 2b | CQI and 2-bit HARQ ACK/NACK (20 + 2 coded bits) |

TABLE 2

| PUCCH format | Modulation scheme | Number of bits per subframe, $M_{bit}$ |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + BPSK | 22 |

TABLE 3

| PUCCH Format | Normal CP | Extended CP |
|---|---|---|
| 1, 1a, 1b | 3 | 2 |
| 2 | 2 | 1 |
| 2a, 2b | 2 | N/A |

TABLE 4

| PUCCH Format | SC-FDMA Symbol Location of RS | |
|---|---|---|
| | Normal CP | Extended CP |
| 1, 1a, 1b | 2, 3, 4 | 2, 3 |
| 2, 2a, 2b | 1, 5 | 3 |

Figure 5A:
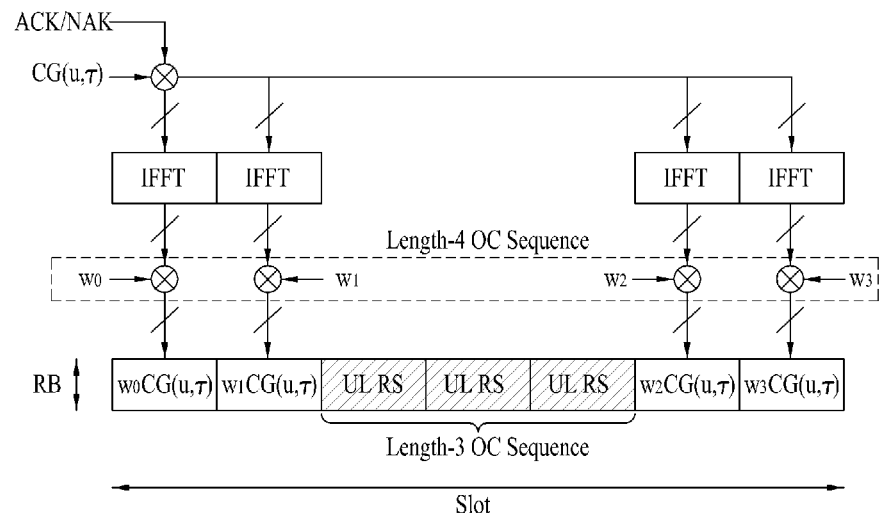
FIGS. 5A and 5B illustrate slot level structures of PUCCH formats 1a/1b.
Figure 5B:
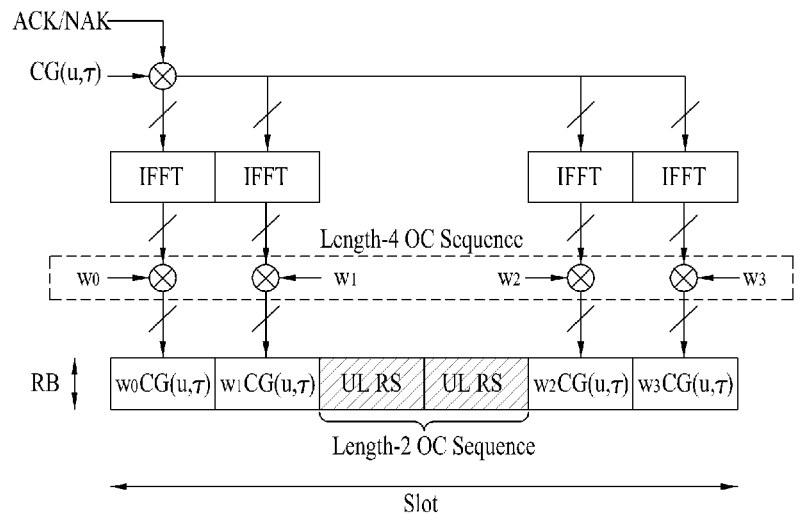

FIG. 5A illustrates PUCCH formats 1a and 1b in a normal CP. FIG. 5B illustrates PUCCH formats 1a and 1b in an extended CP. The same control information is repeated in a subframe on a slot basis in the PUCCH formats 1a and 1b. In each UE, an ACK/NACK signal is transmitted through different resources including different Cyclic Shifts (CSs) (frequency domain codes) of a Computer-Generated Constant Amplitude Zero Auto Correlation (CG-CAZAC) sequence and Orthogonal Covers (OCs) or Orthogonal Cover Codes (OCCs) (time domain spread codes). An OC includes, for example, a Walsh/DFT OC. If the number of CSs is 6 and the number of OCs is 3, a total of 18 UEs may be multiplexed in the same Physical Resource Block (PRB) based on a single antenna. Orthogonal sequences w0, w1, w2, and w3 may be applied in a certain time domain (after FFT modulation) or in a certain frequency domain (before FFT modulation).

For an SR and persistent scheduling, ACK/NACK resources including CSs, OCs, and PRBs may be provided to a UE through Radio Resource Control (RRC). For dynamic ACK/NACK and non-persistent scheduling, ACK/NACK resources may be implicitly provided to a UE by the lowest CCE index of a PDCCH corresponding to a PDSCH.

Figure 6A:
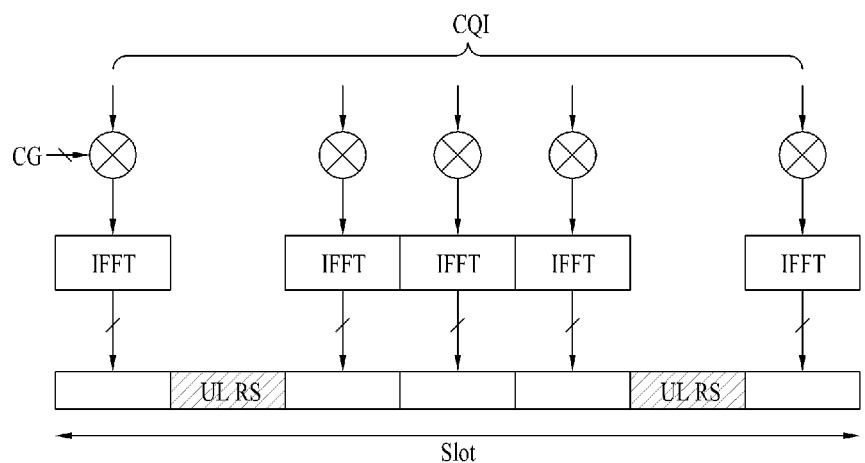
FIGS. 6A and 6B illustrate slot level structures of PUCCH formats 2/2a/2b.
Figure 6B:
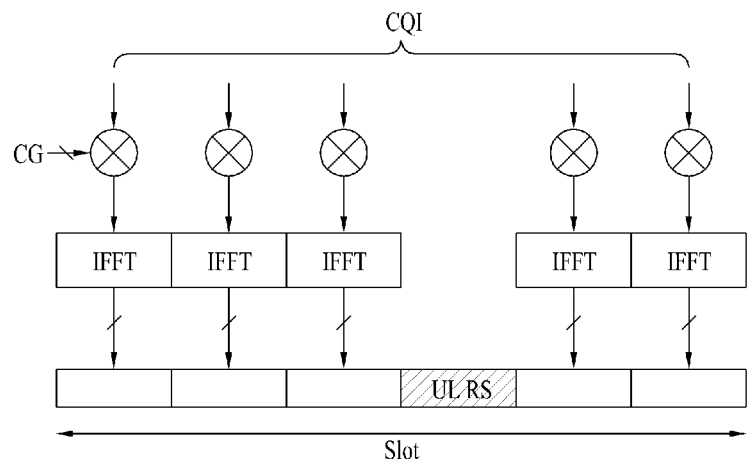

FIG. 6A illustrates a PUCCH format 2/2a/2b in a normal CP. FIG. 6B illustrates a PUCCH format 2/2a/2b in an extended CP. Referring to FIGS. 6a and 6b, one subframe includes 10 QPSK data symbols in addition to RS symbols in the normal CP. Each QPSK symbol is spread by a CS in the frequency domain and then mapped to an SC-FDMA symbol. SC-FDMA symbol level CS hopping may be applied for randomization of inter-cell interference. An RS may be multiplexed by CDM using a CS. Assuming that the number of available CSs is 12 or 6, 12 or 6 UEs may be multiplexed in the same PRB. In summary, a plurality of UEs may be multiplexed by CSs, OCs, and PRBs in the PUCCH format 1/1a/1b and by CSs and PRBs in the PUCCH format 2/2a/2b.

Length-4 and length-3 OC sequences for PUCCH formats 1/1a/1b are shown in Table 5 and Table 6 below.

TABLE 5

| Length-4 orthogonal sequences for PUCCH formats 1/1a/1b | |
|---|---|
| Sequence index $n_{oc}(n_s)$ | Orthogonal sequences $[w(0) \ldots w(N_{SF}^{PUCCH} - 1)]$ |
| 0 | [+1 +1 +1 +1] |
| 1 | [+1 −1 +1 −1] |
| 2 | [+1 −1 −1 +1] |

TABLE 6

Length-3 orthogonal sequences for PUCCH formats 1/1a/1b

| Sequence index $n_{oc}(n_s)$ | Orthogonal sequences $[w(0) \ldots w(N_{SF}^{PUCCH} - 1)]$ |
|---|---|
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

An OC sequence for an RS in PUCCH formats 1/1a/1b is shown in Table 7.

TABLE 7

| | 1a and 1b | |
|---|---|---|
| Sequence index $\bar{n}_{oc}(n_s)$ | Normal cyclic prefix | Extended cyclic prefix |
| 0 | [1 1 1] | [1 1] |
| 1 | [1 $e^{j2\pi/3}$ $e^{j4\pi/3}$] | [1 −1] |
| 2 | [1 $e^{j4\pi/3}$ $e^{j2\pi/3}$] | N/A |

FIG. 7 illustrates a process of processing UL-SCH data and control information.

Referring to FIG. 7, error detection is provided on UL-SCH transport blocks through a CRC in step S100.

All the transport blocks are used to calculate CRC parity bits. Bits in a transport block delivered to a first layer are denoted by $a_0, a_1, a_2, a_3, \ldots, a_{A-1}$. Parity bits are denoted by $p_0, p_1, p_2, p_3, \ldots, p_{L-1}$. The size of the transport block is A and the number of parity bits is L.

Code block segmentation and code block CRC attachment are performed after transport block CRC attachment at step S110. If the number of bits of a transport block (including CRC) is B, bits input for code block segmentation are denoted by $b_0, b_1, b_2, b_3, \ldots, b_{B-1}$. If a code block number is r and the number of bits for the code block number r is Kr, then bits provided after code block segmentation are denoted by $c_{r0}, c_{r1}, c_{r2}, c_{r3}, \ldots, c_{r(K_r-1)}$.

Channel coding is performed after code block segmentation and code block CRC attachment at step S120. If an i-th coded stream for the code block number r is $D_r$, i.e. $D_r=K_r+4$, bits after channel coding are denoted by $d_{r0}^{(i)}, d_{r1}^{(i)}, d_{r2}^{(i)}, d_{r3}^{(i)}, \ldots, d_{r(D_r-1)}^{(i)}$.

Rate matching is performed in a turbo coded block after the channel coding at step S130. If the number of coded blocks is r and the number of rate-matched bits for the code block number r is $E_r$, bits after rate matching are given by $e_{r0}, e_{r1}, e_{r2}, e_{r3}, \ldots, e_{r(E_r-1)}$.

Code block concatenation is performed after rate matching at step S140. When control information is multiplexed with UL-SCH transmission, if the total number of coded bits for transmission for excluding bits used for control transmission is G, bits after code block concatenation are denoted by $f_0, f_1, f_2, f_3, \ldots, f_{G-1}$.

Channel coding of CQI is performed using an input sequence $o_0, o_1, o_2, \ldots, o_{O-1}$ of step S150. An output sequence of channel coding for CQI is denoted by $q_0, q_1, q_2, q_3, \ldots, q_{Q_{CQI}-1}$.

Channel coding of RI is performed using an input sequence $[o_0^{RI}]$ or $[o_0^{RI} o_1^{RI}]$ of step S160. $[o_0^{RI}]$ and $[o_0^{RI} o_1^{RI}]$ indicate 1-bit RI and 2-bit RI, respectively.

Channel coding of a HARQ-ACK is performed using an input sequence $[o_0^{ACK}]$ $[o_0^{ACK} o_1^{ACK}]$, or $[o_0^{ACK} o_1^{ACK} \ldots o_{O^{ACK}-1}^{ACK}]$ of step S170. ACK is encoded to '1' of a binary number and NACK is encoded to '0' of a binary number. HARQ-ACK may include 1-bit information (i.e. $[o_0^{ACK}]$) or 2-bit information (i.e. $o_0^{ACK}$) together with an ACK/NACK bit $o_0^{ACK}$ for codeword 0 and an ACK/NACK bit $o_1^{ACK}$ for codeword 1.

1-bit or 2-bit ACK/NACK or RI is modulated such that the Euclidean distance of a modulation symbol carrying ACK/NACK or RI is maximized. More specifically, a constellation point in the outermost side of a constellation for 16/64-QAM PUSCH modulation is used for ACK/NACK or RI modulation and thus the Tx power of ACK/NACK or RI increases compared to the average power of PUSCH data. Repetition coding is used for 1-bit ACK/NACK or RI. In the case of 2-bit ACK/NACK or RI, a (3,2) simplex code is used and encoded data may be cyclically repeated.

Table 8 shows an example of channel coding of 1-bit HARQ-ACK and Table 9 shows an example of channel coding of 1-bit HARQ-ACK/NACK.

TABLE 8

| $Q_m$ | Encoded HARQ-ACK |
|---|---|
| 2 | [$O_0^{ACK}$ y] |
| 4 | [$O_0^{ACK}$ y x x] |
| 6 | [$O_0^{ACK}$ y x x x x] |

TABLE 9

| $Q_m$ | Encoded HARQ-ACK |
|---|---|
| 2 | [$o_0^{ACK} o_1^{ACK} o_2^{ACK} o_0^{ACK} o_1^{ACK} o_2^{ACK}$] |
| 4 | [$o_0^{ACK} o_1^{ACK}$ X X $o_2^{ACK} o_0^{ACK}$ X X $o_1^{ACK} o_2^{ACK}$ X X] |
| 6 | [$o_0^{ACK} o_1^{ACK}$ x x x x $o_2^{ACK} o_0^{ACK}$ x x x x $o_1^{ACK} o_2^{ACK}$ x x x x] |

Here, Qm denotes modulation order. For example, modulation orders 2, 4, and 6 may correspond to QPSK, 16QAM, and 64 QAM, respectively. $o_0^{ACK}$ represents an ACK/NACK bit for codeword 0 and $o_1^{ACK}$ represents an ACK/NACK bit for codeword 1. $o_2^{ACK}=(o_0^{ACK}+o_1^{ACK})$mod 2 and 'mod' denotes a modulo operation. 'x' or 'y' is a place holder for maximizing the Euclidean distance of a modulation symbol carrying HARQ-ACK/NACK information when an HARQ-ACK bit is scrambled. Each of 'x' and 'y' has a value of 0 or 1.

HARQ-ACK may include information of two bits or more. That is, if $O^{ACk}>2$, then the HARQ-ACK is $[o_0^{ACK} o_1^{ACK} \ldots o_{O^{ACK}-1}^{ACK}]$. If the total number of coded bits for coded HARQ-ACK blocks is $Q_{ACK}$, a bit sequence $q_0^{ACK}, q_1^{ACK}, q_2^{ACK}, \ldots, q_{Q_{ACK}}^{ACK}$ is obtained through a combination of a plurality of coded HARQ-ACKs.

Inputs of a data/control multiplexing block of step S180 are UL-SCH coded bits denoted by $f_0, f_1, f_2, f_3, \ldots, f_{G-1}$ and coded control information bits denoted by $q_0, q_1, q_2, q_3, \ldots, q_{Q_{CQI}-1}$.

If $H=(G+Q_{CQI})$, $H'=H/Q_m$, and $g_i$ (where i=0, ..., H'−1) is a column vector of length $Q_m$, an output of the data/control multiplexing block is given by $g_0, g_1, g_2, g_3, \ldots, g_{H+-1}$. H is the total number of coded bits allocated for UL-SCH data and CQI/PMI information.

Channel interleaving of step S190 is performed with respect to the output of the data/control multiplexing block, $g_0, g_1, g_2, \ldots, g_{H+-1}$, the coded RI $q_0^{RI}, q_1^{RI}, q_2^{RI}, \ldots, q_{Q'_{RI}-1}^{RI}$, and the coded HARQ-ACK $q_0^{ACK}, q_1^{ACK}, q_2^{ACK}, \ldots, q_{Q'_{ACK}-1}^{ACK}$. $g_i$ (i=0, ..., H'−1) is a column vector of length $Q_m$ and H'=H/$Q_m$. $q_i^{ACK}$ (i=0, ..., $Q'_{ACK}$−1) is a column vector of length $Q_m$ and $Q'_{ACK}=Q_{ACK}/Q_m$. $q_i^{RI}$ (i=0, ..., $Q'_{RI}$−1) is a column vector of length $Q_m$ and $Q'_{RI}=Q_{RI}/Q_m$.

Channel interleaving multiplexes control information and UL-SCH data on PUSCH resources. More specifically, channel interleaving includes a process of mapping of control information and UL-SCH data to a channel interleaver matrix corresponding to PUSCH resources.

After channel interleaving, a bit sequence $h_0, h_1, h_2, \ldots, h_{H'+Q_{RI}-1}$ read from the channel interleaver matrix row by row is generated. The number of modulation symbols of a subframe is $H''=H'+Q'_{RI}$. The read bit sequence is mapped onto a resource grid.

A channel interleaving operation focusing on ACK/NACK will now be described in more detail. The number of columns of the interleaver matrix is $C_{mux}=N_{symb}^{PUSCH}$. $N_{symb}^{PUSCH}$ represents the number of SC-FDMA symbols obtained by subtracting the number of RS SC-FDMA symbols (the number of SRS SC-FDMA symbols in the case of an SRS subframe) from the total number of SC-FDMA symbols in a subframe. The number of rows of the interleaver matrix is $R_{mux}=(H'' \cdot Q_m)/C_{mux}$, and $R'_{mux}=R_{mux}/Q_m$. RI is mapped first in the interleaver matrix and CQI/UL-SCH data is mapped to the remaining area. Specifically, RI is written in columns corresponding to SC-FDMA symbols shown in FIG. 8 and is written from the bottom to top of the matrix. The CQI/UL-SCH data is written from the left, top (i.e. column 0 and row 0) to right of the interleaver matrix. After the CQI/UL-SCH data is all written in rows, it is written in the next column. An element in which a value is written in the matrix is skipped.

Table 10 shows an interleaver matrix in which RI and CQI/UL-SCH data are written.

TABLE 10

$$\begin{bmatrix} y_0 & y_1 & y_2 & \cdots & y_{C_{mux}-1} \\ y_{C_{mux}} & y_{C_{mux}+1} & y_{C_{mux}+2} & \cdots & y_{2C_{mux}-1} \\ \vdots & \vdots & \vdots & \ddots & \vdots \\ y_{(R'_{mux}-1) \times C_{mux}} & y_{(R'_{mux}-1) \times C_{mux}+1} & y_{(R'_{mux}-1) \times C_{mux}+2} & \cdots & y_{(R'_{mux} \times C_{mux}-1)} \end{bmatrix}$$

A HARQ-ACK/NACK vector sequence $q_0^{ACK}, q_1^{ACK}, q_2^{ACK}, \ldots, q_{Q'_{ACK}-1}^{ACK}$ overwrites a value written in the interleaver matrix. HARQ-ACK is written in columns corresponding to SC-FDMA symbols next to RSs and is written from the bottom to top of the matrix.

Table 11 shows a process of writing HARQ-ACK/NACK in the interleaver matrix.

TABLE 11

Set i,j to 0.***Set r to $R_{mux}'-1$ *while i < $Q_{ACK}'$ ***
    $c_{ACK}$ = ColumnSet(j)***     $y_{r \times C_{mux}+c_{ACK}} = q_i^{ACK}$ ***
    i = i + 1 ***      r = $R_{mux}' - 1 - \lfloor i/4 \rfloor$ ***
    j = (j + 3)mod 4 *****end while Table 12 shows a column set in which HARQ-ACK/NACK is written.

TABLE 12

| CP configuration | Column Set |
| --- | --- |
| Normal | {2, 3, 8, 9} |
| Extended | {1, 2, 6, 7} |

Figure 8:
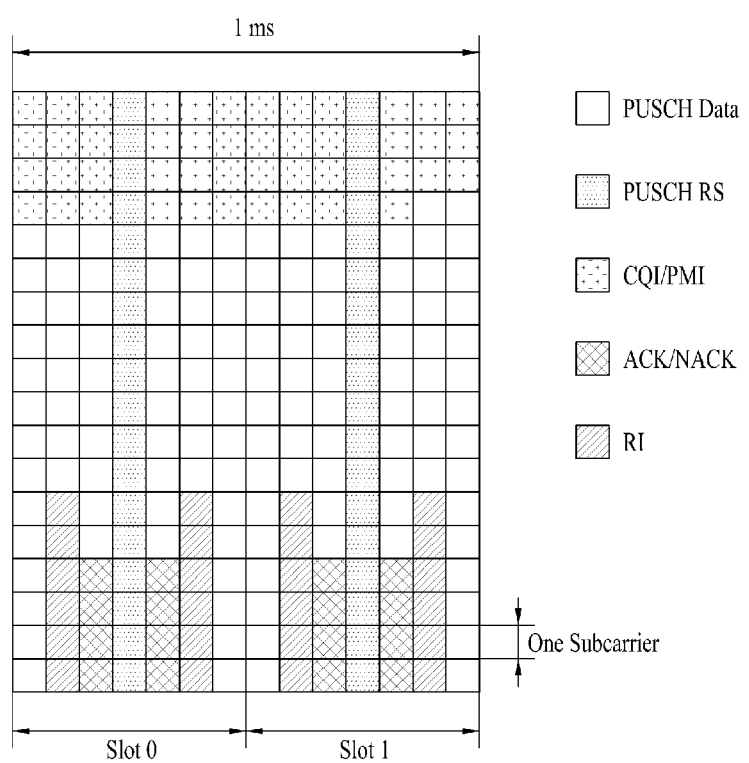
FIG. 8 illustrates multiplexing of control information and UL-SCH data on a PUSCH.

FIG. 8 illustrates multiplexing of control information and UL-SCH data on a PUSCH. If it is desired to transmit control information in a subframe to which PUSCH transmission is allocated, a UE multiplexes control information (UCI) and UL-SCH data prior to DFT spreading. The control information includes at least one of CQI/PMI, HARQ ACK/NACK, and RI. Since a BS can pre-recognize control information to be transmitted through a PUSCH, the BS may easily demultiplex the control information and data packets.

Referring to FIG. 8, CQI and/or PMI (CQI/PMI) resources are located at the beginning part of UL-SCH data resources. The CQI/PMI resources are sequentially mapped to all SC-FDMA symbols on one subcarrier and then are mapped to symbols on the next subcarrier (time-first mapping). The CQI/PMI resources are mapped starting from left to right within each subcarrier, namely, in the direction of ascending SC-FDMA symbol index. PUSCH data (UL-SCH data) is rate-matched in consideration of CQI/PMI. A modulation order which is the same as the modulation order of the UL-SCH data may be used for CQI/PMI. If CQI/PMI information size (payload size) is small (e.g. 11 bits or less), the CQI/PMI information may use a (32, k) block code in a similar way to PUCCH transmission and encoded data may be cyclically repeated. A CRC is not used when the CQI/PMI information size is small. If the CQI/PMI information size is large (e.g. 11 bits or more), an 8-bit CRC is added and channel coding and rate matching are performed using a tail-biting convolutional code. ACK/NACK is inserted through puncturing into part of SC-FDMA resources to which the UL-SCH data is mapped. ACK/NACK is located next to an RS and is filled from the bottom to top of an SC-FDMA symbol, i.e. in the direction of ascending subcarrier index. In a normal CP, symbols for ACK/NACK are located at SC-FDMA symbols #2 and #5 as shown in FIG. 8. Irrespective of whether ACK/NACK is actually transmitted in a subframe, a coded RI symbol is located next to the symbol for ACK/NACK. RI and CQI/PMI are independently coded and the UL-SCH data is rate-matched in consideration of RI in a similar manner to the case of CQI/PMI.

In LTE, control information (e.g. QPSK modulated) may be scheduled to be transmitted on a PUSCH without UL-SCH data. Control information (CQI/PMI, RI and/or ACK/NACK) is multiplexed before DFT-spreading in order to maintain low Cubic Metric (CM) and single-carrier properties. Multiplexing of ACK/NACK, RI, and CQI/PMI is similar to multiplexing illustrated in FIG. 8. An SC-FDMA symbol for ACK/NACK is located next to an RS and CQI-mapped resources may be punctured. The numbers of REs for ACK/NACK and RI are based on a reference MCS (CQI/PMI MCS) and an offset parameter ($\Delta_{offset}^{CQI}$, $\Delta_{offset}^{HARQ-ACK}$, or $\Delta_{offset}^{RI}$). The reference MCS is calculated from a CQI payload size and resource allocation. Channel coding and rate matching for control signaling without UL-SCH data is identical to channel coding and rate matching for control signaling with the UL-SCH.

Figure 9:
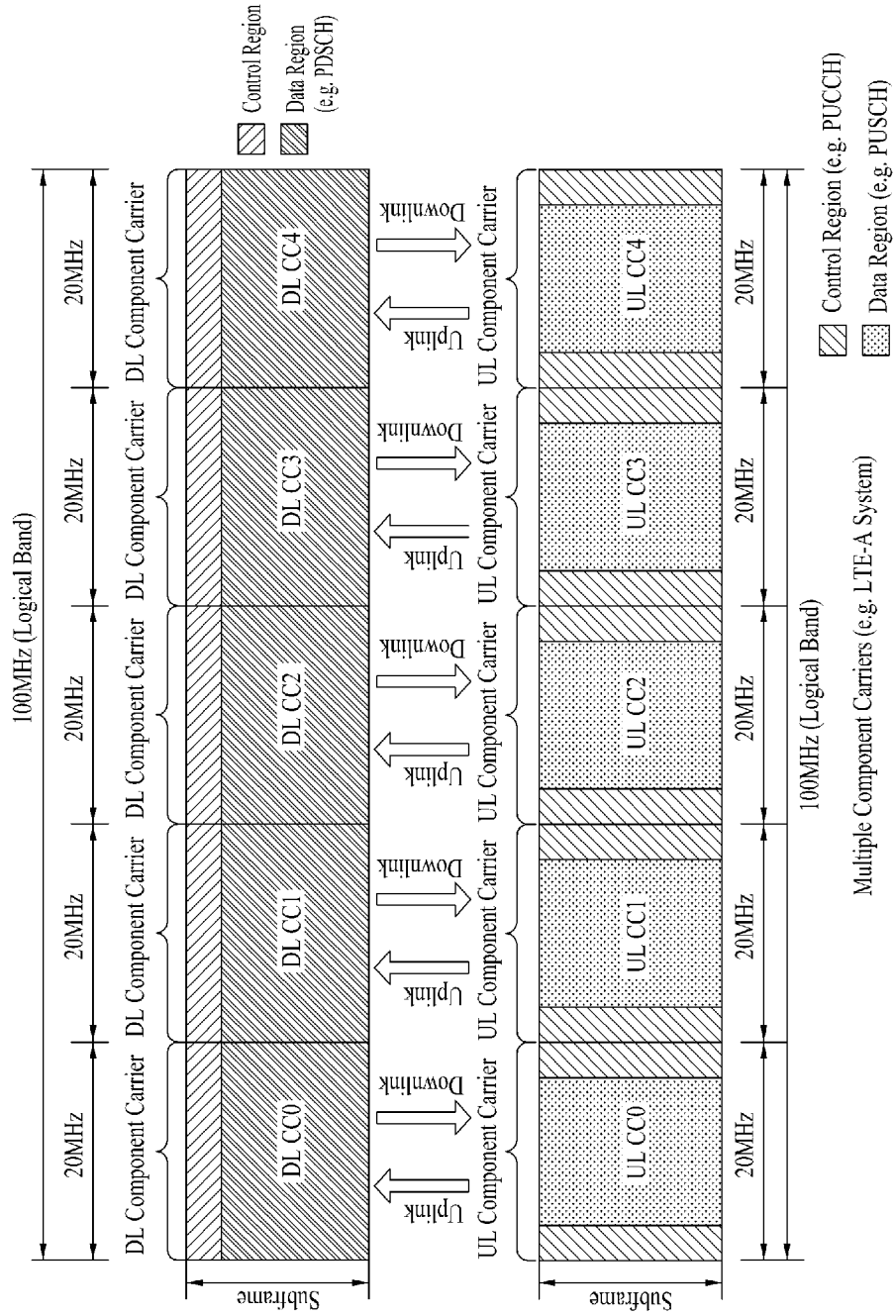
FIG. 9 illustrates a carrier aggregation communication system.

FIG. 9 illustrates a Carrier Aggregation (CA) communication system. An LTE-A system uses CA (or bandwidth aggregation) technology which employs wider UL/DL bandwidth by aggregating a plurality of UL/DL frequency blocks in order to use a wider frequency band. Each frequency block is transmitted using a Component Carrier (CC). The CC may be regarded as a carrier frequency (or a central carrier or central frequency) for the frequency block.

Referring to FIG. 9, a plurality of UL/DL CCs is aggregated to support wider UL/DL bandwidth. The CCs may be contiguous or non-contiguous in the frequency domain. The bandwidth of each CC may be independently determined.

Asymmetric CA in which the number of UL CCs is different from the number of DL CCs may be configured. For example, if the number of DL CCs is 2 and the number of UL CCs is 1, CA may be configured such that the ratio of the DL CCs to UL CCs corresponds to 2:1. A DL CC/UL CC link may be fixed in a system or may be semi-statically configured. Even if a total system band includes N CCs, a frequency band which can be monitored/received by a specific UE may be restricted to M CCs (where M<N). Various parameters for CA may be configured by cell-specific, UE group-specific, or UE-specific signaling. Meanwhile, control information may be configured to be transmitted or received only through specific CCs. Such specific CCs are referred to as Primary CCs (PCCs) (or anchor CCs) and the other CCs may be referred to as Secondary CCs (SCCs).

In an LTE-A system, the concept of a cell is used to manage radio resources. The cell is defined as a combination of a DL resource and a UL resource wherein the UL resource is optional. Accordingly, the cell may be configured with the DL resource alone or with the DL resource and UL resource. When CA is supported, a linkage between a carrier frequency of the DL resource (or DL CC) and a carrier frequency of the UL resource (or UL CC) may be indicated by system information. A cell operating at a primary frequency (or PCC) is referred to as a Primary cell (PCell) and a cell operating at a secondary frequency (or SCC) is referred to as a Secondary Cell (SCell). The PCell is used when a UE performs an initial connection establishment procedure or initiates a connection re-establishment procedure. The PCell may refer to a cell indicated by a handover procedure. The SCell may be configured after RRC connection is established and may be used to provide additional radio resources. The PCell and SCell may be referred to as a serving cell. Hence, in case of a UE that is in an RRC connected (RRC_CONNECTED) state but does not configure or support CA, a single serving cell composed only of a PCell is present. On the other hand, in case of a UE that is in an RRC_CONNECTED state and configures CA, one or more serving cells including a PCell and SCells are present. For CA, a network may configure one or more SCells for a UE supporting CA in addition to a PCell configured initially in the process of a connection establishment procedure after an initial security activation procedure.

Figure 10:
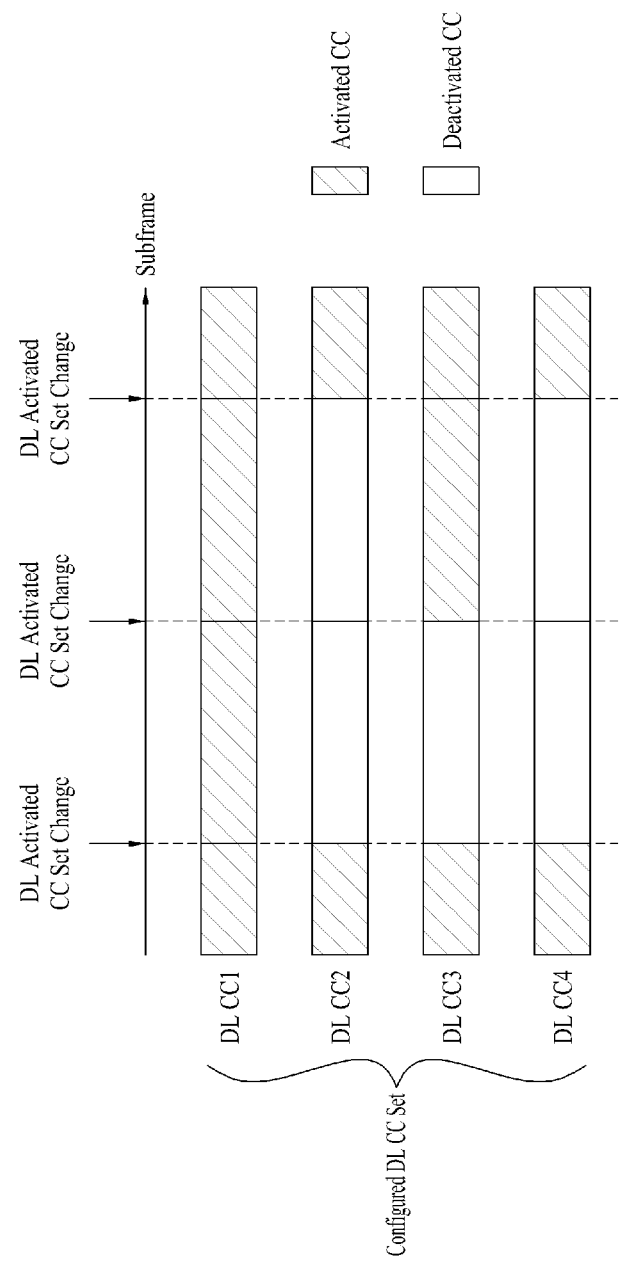
FIG. 10 illustrates an example of dynamically activating/deactivating component carriers.

FIG. 10 illustrates an example of dynamically activating/deactivating CCs. As described with reference to FIG. 9, one UE may use a plurality of CCs in the LTE-A system. The UE may receive DL data using a plurality of CCs or transmit UL data throughout a plurality of CCs. The plurality of CCs may be configured by higher-layer signaling (e.g. RRC configuration). However, if a data traffic characteristic of the UE is bursty, the CCs configured by higher-layer signaling cannot be efficiently used. Accordingly, a method for dynamically activating/deactivating a DL CC set is proposed in order to efficiently use CCs and to prevent unnecessary power consumption caused by buffering. As considered methods, CCs may be individually activated/deactivated or all remaining DL CCs except for a specific main CC (or CCs) (e.g. DL anchor CC) may be simultaneously activated/deactivated.

For example, a total of four DL CCs (DL CC 1 to DL CC 4) may be configured for one UE and the number of DL CCs which can be received may be dynamically restricted or extended using an activation/deactivation signal. It is assumed that the total of four DL CCs (DL CC 1 to DL CC 4) is configured by higher-layer signaling (e.g. RRC configuration) and is semi-statically changed. The CC activation/deactivation signal may be transmitted using an L1/L2 signal, for example, a physical layer control signal (PDCCH), a MAC layer signal (PDSCH), etc. Activated CCs/deactivated CCs may be quickly configured at a subframe level by the L1/L2 activation/deactivation signal.

In the LTE-A system, a UE may receive data through a plurality of PDSCHs on a plurality of DL CCs and thus the UE should be able to transmit multiple ACKs/NACKs through one or multiple UL CCs in one subframe. Transmission of multiple ACKs/NACKs using a PUCCH ACK/NACK format 1a/1b in one subframe requires much transmission power and raises a Peak-to-Average Power Ratio (PAPR) of a UL transmission signal. This leads to inefficient use of transmission power, thus reducing UE coverage. For such a reason, ACK/NACK bundling or ACK/NACK multiplexing has been used in a legacy LTE system in order to enable transmission of a single PUCCH (format 1a/1b) when transmission of multiple ACKs/NACKs is needed. However, as the amount of ACK/NACK information continues to increase due to an increase in the number of multiple DL CCs or an increase in DL subframes in TDD, there is a limit to efficient feedback of an ACK/NACK payload of various sizes only using a conventional ACK/NACK transmission mode.

The present invention proposes a method for efficiently transmitting ACK/NACK infoiination. Herein, the ACK/NACK information includes an ACK/NACK state and/or a Discontinuous Transmission (DTX) state for a specific carrier or a specific channel (e.g. PDCCH or PDSCH). NACK and DTX may be coupled as one state.

According to the present invention, various channels may be configured in an ACK/NACK transmission mode according to the size of a payload to be transmitted and various transmission modes may be configured. A channel over which ACK/NACK can be transmitted may have one of the following formats. Herein, the ACK/NACK payload includes one or more pieces of ACK/NACK information and corresponds to an input of the channel coding block (S170) in FIG. 7. For example, the ACK/NACK information may be represented as $[o_0^{ACK}]$ or $[o_0^{ACK}\ o_1^{ACK}]$ according to the number of ACK/NACK bits and the ACK/NACK payload may be represented as $[o_0^{ACK}\ o_1^{ACK},\ \ldots,\ o_{O^{ACK}-1}^{ACK}]$. Herein, a subscript $o^{ACK}$ denotes the total number of bits of the ACK/NACK payload.

1) LTE PUCCH format 1 series: the ACK/NACK payload may be transmitted using up to two bits. The legacy LTE PUCCH format 1 series is the same as that described with reference to FIG. 5.

2) Extended LTE PUCCH format 1 series: this format is extended from the legacy LTE PUCCH format 1 series LTE to accommodate a larger size of the ACK/NACK payload. For example, the extended format may be obtained by increasing a modulation order in the legacy LTE PUCCH format 1 series. Since the legacy LTE PUCCH format 1 series uses BPSK or QPSK modulation, only a maximum of 2 bits can be transmitted in one subframe. Increase of the modulation order (e.g. to 8-PSK or 16-QAM) allows a larger size of the ACK/NACK payload. In addition, a time-domain Spreading Factor (SF) may be adjusted. In the legacy LTE PUCCH format 1 series, an SF of an orthogonal code is 4 and therefore the number of ACK/NACK symbols transmittable per slot is 1. However, if the SF is reduced to 2 or 1 from 4, the number of ACK/NACK symbols per slot which can be transmitted by one UE can be extended to 2 or 4 from 1. Additionally, slot hopping may be eliminated. Furthermore, information may be transmitted on a slot basis. Since the same information is repeated at a slot level in the legacy LTE PUCCH format 1 series, a maximum of 2-bit ACK/

NACK information can be transmitted. Accordingly, a maximum of 4-bit ACK/NACK information can be transmitted by independently transmitting information on a slot basis. Moreover, multiplexing may be performed by increasing the size of a frequency-domain resource (e.g. PUCCH configuration using two or more RBS) or through frequency-domain division. Multiple PUCCH resources may be used through channel selection or multiple PUCCH resources may simply be used. Additionally, a payload of a channel may be extended by attempting various extensions through multiple PUCCHs.

3) LTE PUCCH format 2 series: the ACK/NACK information may be transmitted using the legacy LTE PUCCH format 2. The conventional LTE PUCCH format 2 series is the same as that described with reference to FIG. 6. In this case, as many pieces of ACK/NACK information as the amount of a CQI payload which can be transmitted in legacy LTE may be transmitted. A Reed-Muller (RM) code used during ACK/NACK transmission may be used and QPSK modulation may be used. If the amount of ACK/NACK information to be transmitted is 11 bits or more, Tail-Biting Convolution Coding (TBCC), or dual RM coding for dividing the information into two pieces which have the same number of bits or one-bit difference based on a predetermined rule and then performing multiplexing again by RM-coding them in a (32,x) or (20,x) form may be applied. If the amount of ACK/NACK information is less than 11 bits, a single RM coding scheme may be applied. Although the above example has described the case in which the amount of ACK/NACK information applying different coding schemes is 11 bits, other bits such as 10 or 14 bits may be used based on a coding gain criterion during design.

4) Extended LTE PUCCH format 2 series: a modulation order may be increased in order to transmit more pieces of ACK/NACK information. Since the legacy LTE PUCCH format 2 series uses QPSK modulation, a maximum of 20 bits can be transmitted in one subframe. A larger size of the ACK/NACK payload may be transmitted by increasing the modulation order (e.g. 8-PSK, 16-QAM, etc.) The size of the ACK/NACK payload may be extended using multiple PUCCH resources. The multiple PUCCH resources may be configured in the same PUCCH format, different PUCCH formats, a bundle of the PUCCH format 2 series, or a bundle of the PUCCH format 1 series.

5) New PUCCH format: a new PUCCH format may be used to transmit more pieces of ACK/NACK information than that supported by the legacy LTE PUCCH format 2 series. The new PUCCH format may be configured through sequence spreading in the time or frequency domain. This structure may be compatible with the legacy PUCCH format 1 or format 2 series.

6) Transmission using a PUSCH: ACK/NACK may be transmitted by piggybacking it on a PUSCH transmission resource through the same method as in legacy LTE Rel-8/9. That is, data symbols mapped to allocated frequency transmission resources on two symbols adjacent to Demodulation Reference Signals (DM-RSs) positioned in each slot of a UL subframe may be punctured by a number required for ACK/NACK transmission and ACK/NACK transmission symbols after coding and modulation may be mapped to the punctured positions. In this case, when a frequency sample forming process through Discrete Fourier Transform (DFT) in a UL is considered, the frequency transmission resources may be regarded as virtual frequency transmission resources. As another method, if there are a large number of ACK/NACK bits, the ACK/NACK information may be transmitted using a transmission mode and multiplexing scheme applied to data traffic as opposed to a conventional PUSCH piggyback scheme. For example, an ACK/NACK payload may be piggybacked on a PUSCH using a similar method to CQI multiplexing on the PUSCH in legacy LTE. The size of a transmittable payload may be considerably increased.

7) Use of MIMO transmission mode: the foregoing ACK/NACK transmission schemes may be extended through a MIMO scheme. Each antenna may have a structure using independent time-frequency resources or a structure transmitting signals using the same time-frequency resource. To obtain beamforming gain, the same ACK/NACK information may be simply repeated in a spatial domain. To obtain diversity, the same ACK/NACK information may be modified through antennas. The ACK/NACK information may be transmitted in a spatially multiplexed form through multiple antennas in order to transmit more ACK/NACK information.

There may be various ACK/NACK transmission modes. A wireless communication system may use the foregoing one or more transmission schemes in order to implement multiple ACK/NACK transmission modes.

To efficiently use the above-described ACK/NACK transmission modes, the UE should be able to be accurately aware of how many PUCCHs (PDSCHs) are transmitted by the BS and of an ACK/NACK payload size. The PDCCHs (or PDSCHs) and/or ACK/NACK payload size corresponding thereto should be known to the UE and the BS. Otherwise, an ACK/NACK feedback channel to be used by the UE and a channel expected by the BS may have different forms. Such uncertainty brings about unstable system operation and thus it is preferred that a correct channel be selected whenever the UE transmits ACK/NACK. To this end, the following methods may be considered.

1) Use of a coordination field: information as to how many PDCCHs or PDSCHs a UE should receive may be transmitted to a UE together with DL grant information (in other words, DL scheduling information) in a joint coded form or an individually coded form. Accordingly, the coordination field is included in the DL grant information and provides traffic information or scheduling information for which ACK/NACK is required. For example, the coordination field may include the total count value (total number) of PDCCHs (or PDSCHs) or ordering value ascending in each PDCCH (or PDSCH). In TDD, for instance, a BS may inform a UE of the total count value for the numbers of PDCCHs for transmission through a value of a Downlink Assignment Index (DAI) field in a DL grant. Obviously, the DL grant information may include both the total count value of PDCCHs (or PDSCHs) and an ordering value of the PDCCHs (or PDSCHs). The UE may determine whether lost PDCCHs (or PDSCHs) are present by comparing the value of the coordination field with the number of actually detected PDCCHs (or PDSCHs) (when the UL grant information includes the of total count value) or checking whether there are omitted values in the received coordination field (when the UL grant information includes the ordering value).

If ACK/NACK information is actually carried on a payload, proper ordering information may be included in the DL grant information to determine a bit location at which the ACK/NACK information is carried or a multiplexing location. Such multiplexing ordering/location information may indicate a relative location or an absolute location of individual ACK/NACK information (bit) in the payload. In this case, ACK/NACK information corresponding to a null ordering/location is set to NACK and the BS is able to determine a PDCCH (or PDSCH) that the UE loses. Meanwhile, if the multiplexing ordering/location information is included in the DL grant information, the BS can actively cope with variation of traffic for the UE but leads to scheduling information overhead.

Accordingly, another method is used to determine the bit location or multiplexing location (multiplexing location/order) at which ACK/NACK is actually carried according to a predetermined rule. For example, the multiplexing location/order of ACK/NACK information in the payload may be determined in consideration of a carrier index order. Consequently, the multiplexing location/order of individual ACK/NACK information in the payload corresponds to a carrier (index) in which the PDCCH (or PDSCH) is detected. The carrier index may include, for example, serving cell index (ServCellIndex) information configured by RRC. Since the multiplexing location/order of ACK/NACK information corresponds to each carrier, the UE should generate ACK/NACK information for all carriers (e.g. all aggregated carriers, all activated carriers, or all monitoring carriers), irrespective of whether the PDCCH (or PDSCH) is actually detected in a carrier, in order to maintain the multiplexing location/order of the ACK/NACK information.

The carrier index order includes a physical carrier index order or a logical carrier index order. The physical carrier index order may be indexed in the direction of ascending or descending a frequency based on a reference physical carrier (e.g. a PCC). The logical carrier index order may be used to change a mapping relationship between the multiplexing location/order and the physical carrier index. Accordingly, the logical carrier index may be regarded as a logical index for connecting the multiplexing location/order and the physical carrier index or as a mapping relationship between the multiplexing location/order and the physical carrier index.

For example, the physical carrier index may be connected to the logical carrier index according to a mapping rule and the logical carrier index may be connected to the multiplexing location/order according to a mapping rule. If a logical carrier index order is equal to a multiplexing location/order, the physical carrier index corresponds to the multiplexing location/order according to a mapping rule (i.e. logical carrier index order). The relationship between the physical carrier index and the logical carrier index may be prescheduled or may be configured through RRC signaling or MAC signaling. Similarly, the relationship between the logical carrier index and the multiplexing location/order may be prescheduled (e.g. as an identical value) or may be configured through RRC signaling or MAC signaling.

Further, a bit location or multiplexing location (multiplexing location/order) at which ACK/NACK is actually carried in a payload may be determined according to a PDCCH type (or ACK/NACK type) corresponding to a PDSCH. For instance, an ACK/NACK (ACKs/NACKs) for a PDCCH (or PDSCH) for dynamic scheduling may be multiplexed first and then an ACK/NACK for a PDCCH (or PDSCH) for semi-persistent scheduling may be multiplexed. Namely, the ACK/NACK for the PDCCH (or PDSCH) for semi-persistent scheduling may be carried on the last part of an ACK/NACK payload. As another example of TDD different from this case, a location/order of ACK/NACK for dynamic scheduling and a location/order of ACK/NACK for semi-persistent scheduling may be defined according to an individual DL cell (carrier). That is, the location/order of ACK/NACK for PDSCH transmission for semi-persistent scheduling on a certain DL cell may be located at the last part of the payload and the location/order of ACKs/NACKs for a plurality of DL cells may be configured in a carrier index order. Alternatively, ACK/NACK for a PDCCH (or PDSCH) for semi-persistent scheduling is multiplexed first and then ACK/NACK (ACKs/NACKs) for a PDCCH (or PDSCH) for dynamic scheduling may be multiplexed. To determine multiplexing location/order, a combination of a scheme considering a carrier index order and a scheme considering a PDCCH (or ACK/NACK) type may be used.

Figure 11:
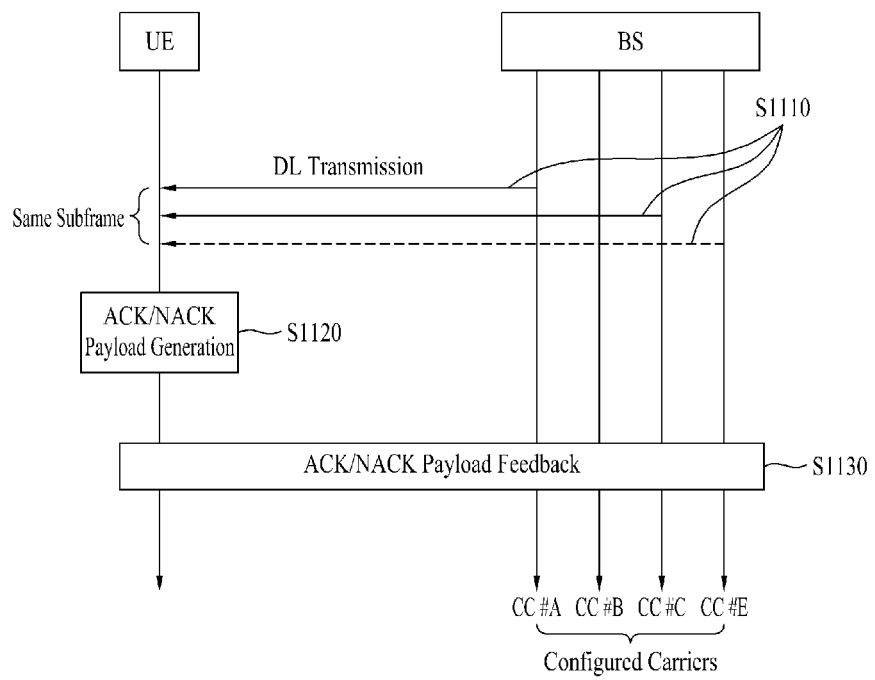
Figure 13:
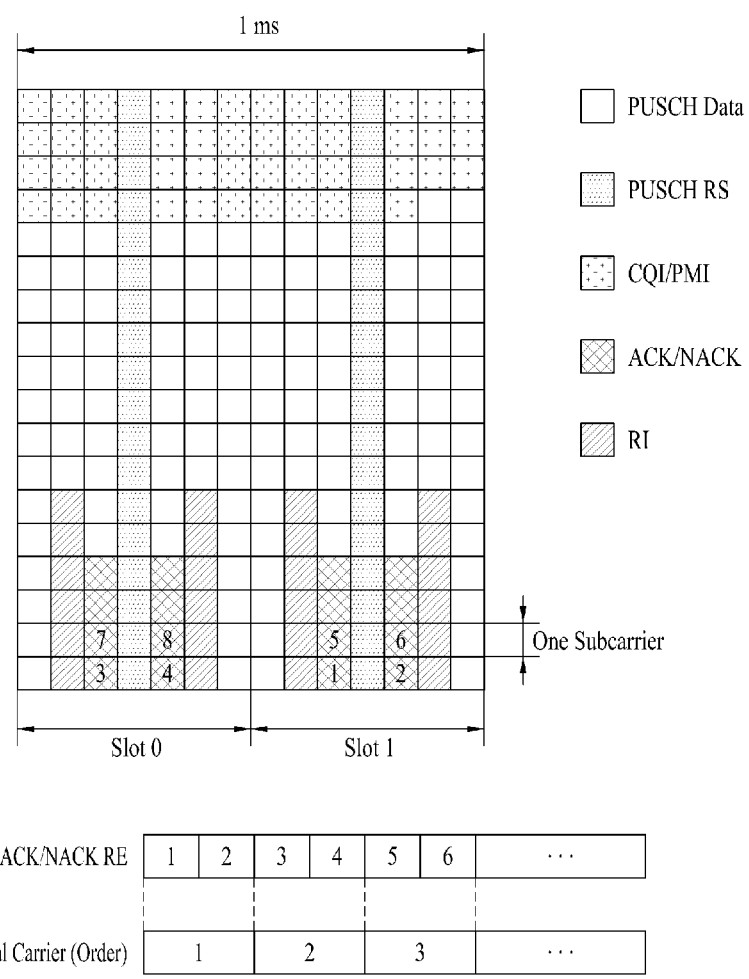

FIGS. 11 to 13 illustrate a method for configuring an ACK/NACK payload using multiplexing location/order of ACK/NACK information and transmitting the ACK/NACK information. For convenience, in the illustrated example, the multiplexing location/order of ACK/NACK information corresponds to a carrier. However, the same or similar principle may be applied to all cases in which the multiplexing location/order of ACK/NACK information is explicitly/implicitly signaled.

Referring to FIG. 11, a UE includes four configured carriers (CC #A, CC #B, CC #C, and CC #E). The carriers configured for the UE are a subset of all carriers which can be used by a system. The configured carriers may be regarded as aggregated carriers, activated carriers, or monitoring carriers. A BS performs concurrent DL transmission (e.g. in the same subframe) on three carriers (CC #A, CC #B, and CC #E) (step S1110). DL transmission includes PDCCH and/or PDSCH transmission. For cross-carrier scheduling, a PDCCH and a PDSCH may be transmitted on different carriers. In this case, a carrier on which DL transmission is performed may be determined based on the PDCCH or PDSCH. On the other hand, the UE receives/detects DL transmission only on the carriers CC #A and CC #C and fails to receive/detect DL transmission on the carriers CC #B and CC #E. Next, the UE generates an ACK/NACK payload corresponding to DL transmission (step S1120) and feeds back the ACK/NACK payload to the BS (step S1130). The location of each piece of ACK/NACK information in the ACK/NACK payload corresponds to each carrier. For this purpose, each piece of ACK/NACK information per carrier is generated. The UE generates ACK/NACK information with respect to all of the configured carriers. Accordingly, the BS is able to correctly identify ACK/NACK information for DL transmission on the carriers CC #A, CC #B, and CC #E based on the locations of ACK/NACK information in the ACK/NACK payload.

FIG. 12 illustrates the structure of an ACK/NACK payload. Referring to FIG. 12, the ACK/NACK payload includes a plurality of pieces of ACK/NACK information and each piece of ACK/NACK information corresponds to each carrier (FIG. 12(a)). In FIG. 12, one piece of ACK/NACK information corresponds to one carrier. However, a plurality of pieces of ACK/NACK information may correspond to one carrier in a MIMO circumstance. The illustrated mapping relationship may be implemented using a logical carrier index (order). For example, carriers CC #A, CC #B, CC #C, and CC #E are mapped to logical carrier indexes #0, #2, #3, and #1, respectively and the logical carrier index order may be mapped to the location/order of the ACK/NACK information in the ACK/NACK payload. If the ACK/NACK information includes a Semi-Persistent Scheduling (SPS) ACK/NACK, the SPS ACK/NACK may be located at a specific position (e.g. the last end) of the ACK/NACK payload (FIG. 12(b)). The SPS ACK/NACK indicates ACK/NACK for a PDCCH (or PDSCH) in relation to SPS activation/release. FIG. 13 illustrates an example of piggybacking an ACK/NACK payload on a PUSCH. According to a legacy LTE rule, ACK/NACK modulation symbols on PUSCHs are mapped in order of numbers indicated in SC-FDMA symbols next to RSs. In this case, an RE to which ACK/NACK information is mapped, (referred to as an ACK/NACK RE), corresponds in location to a carrier. In FIG. 13, a piece of the ACK/NACK information generated with respect to each carrier is separate-coded and each coding block is mapped to two REs. The number of REs to which one piece of ACK/NACK information is mapped varies with a channel coding scheme. In a MIMO circumstance, multiple pieces of ACK/NACK information may be generated per carrier.

2) Use of carrier configuration: an ACK/NACK payload may be configured using carrier configuration information. For example, the size of the ACK/NACK payload is designed to match the number of configured carriers. More specifically, the ACK/NACK payload may be configured to match the total number of DL activated carriers. The ACK/NACK payload may also be configured based on a total PDCCH monitoring set. In addition, the ACK/NACK payload may be configured according to the total number of UL activated carriers. The ACK/NACK payload may be configured according to the number of carriers designated as a PCC. Thus, the ACK/NACK payload may be configured to match the number of corresponding carriers and the size thereof may differ according to a MIMO transmission mode. Although the BS may experience scheduling restriction by doing so, the size of ACK/NACK may be determined at all times without overhead. Carrier configuration may be changed in order to follow traffic variation. In configuration of the ACK/NACK payload, the bit location or multiplexing location (multiplexing location/order) of an individual ACK/NACK may be configured by applying the proposal methods described in the present invention. For example, an ACK/NACK (ACKs/NACKs) for a PDCCH (or PDSCH) for dynamic scheduling may be multiplexed first and then an ACK/NACK for a PDCCH (or PDSCH) for SPS may be multiplexed. In other words, the ACK/NACK for a PDCCH (or PDSCH) for SPS may be carried on the last part of the ACK/NACK payload. As another example of TDD different from this case, the location/order of the ACK/NACK for dynamic scheduling and the location/order of the ACK/NACK for semi-persistent scheduling may be differently defined according to an individual DL cell (carrier). That is, the location/order of ACK/NACK for PDSCH transmission for semi-persistent scheduling on a certain DL cell may be located at the last part of the payload and the location/order of ACKs/NACKs for a plurality of DL cells may be configured in a carrier index order. Alternatively, ACK/NACK for a PDCCH (or PDSCH) for semi-persistent scheduling is multiplexed first and then ACK/NACK (ACKs/NACKs) for a PDCCH (or PDSCH) for dynamic scheduling may be multiplexed. To determine bit location or multiplexing location/order of ACK/NACK information for a PDCCH (or PDSCH) for dynamic scheduling, a scheme considering a carrier index order may be applied.

3) Configuration through higher-layer signaling: a BS may have already been aware of the average number of carriers or parallel traffic used by a UE unless traffic of the UE has a very dynamical property (e.g. a situation in which a buffer status is abruptly changed on a subframe basis). Accordingly, the BS informs the UE in advance of information which can determine a channel or payload size to be used for ACK/NACK and the UE may then feedback ACK/NACK information. By doing so, although the BS may not follow abrupt variation in the amount of traffics, it is possible to efficiently manage UE operation and UL control resources. In this case, the UE may receive information about an ACK/NACK channel mode or a payload size in a single carrier mode before using multiple carriers during a carrier aggregation situation while initially operating in a legacy mode and thereafter may proceed to the next multicarrier operation. When carrier configuration is changed, the UE may reconfigure information about additional ACK/NACK configuration. In this method, an ACK/NACK transmission mode need not be reconfigured due to carrier configuration.

If DL or ACK/NACK information (e.g. payload size, etc.) can be acquired from the BS, the UE should select a channel to be used (or an ACK/NACK transmission mode) therefrom. Information configuration may be obtained by the aforementioned methods or by a blind scheme based on automatic search or decision of the UE. Channel selection (or ACK/NACK transmission mode) may be directly directed by the BS or may be autonomously performed by the UE. The former causes the UE to clearly recognize a channel to be used (or ACK/NACK transmission mode). In the latter, in which the UE determines a channel through which ACK/NACK information is to be transmitted (or ACK/NACK transmission mode), the UE may determine the channel (or ACK/NACK transmission mode) according to the ACK/NACK payload size. For example, if the UE should transmit information including two statuses of ACK and NACK with respect to carriers or codewords of a MIMO mode, the UE should select a channel sufficient to indicate ACK/NACK information on the assumption that it should transmit information which includes three statuses containing DTX or five statuses considering two codewords of a MIMO mode (or 1+2n statuses (where n is the number of codewords) when the information includes more codewords). In this case, the ACK/NACK payload size differs according to whether the ACK/NACK information is independently indicated for each carrier or codeword or is joint state mapped (i.e. a method for sharing multiple bits on different carriers without independently distinguishing the bits). If the payload size is determined, the UE selects a feedback channel type (or ACK/NACK transmission mode) suitable for the corresponding payload size and feeds back the ACK/NACK information through a channel allocated thereto within the range of the selected channel type. The channel for ACK/NACK transmission may be implicitly or explicitly allocated. For example, a control channel resource (e.g. CCE index) may be used for implicit channel allocation and DL grant information (or UL grant information) or higher-layer signaling (e.g. RRC signaling) may be used for explicit channel allocation. Multiplexing order of the feedback ACK/NACK information for each CC or codeword may be prescheduled or may be defined according to order directed by the BS to the UE or specific carrier order.

The BS may restrict candidates of a feedback channel which can be selected by the UE. For example, if an extended PUCCH format which can accommodate various sizes is defined so that the UE can contain all possible ACK/NACK feedback information, the BS may cause the UE to select the extended PUCCH format all the time. In addition, the BS may restrict the selection range of an ACK/NACK feedback channel to be used by the UE by configuring the legacy LTE PUCCH format 1 series and another specific series (e.g. a PUCCH format 2 series or a new PUCCH format) as a pair.

Figure 14:
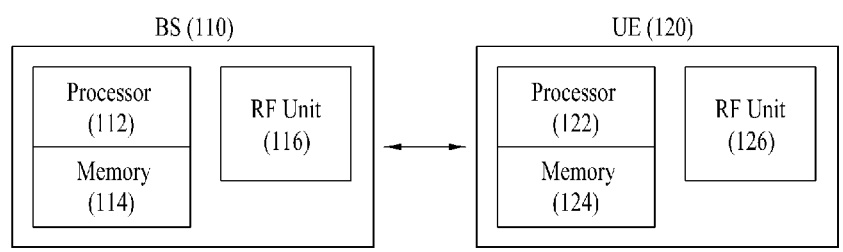
FIG. 14 illustrates a BS and a UE which are applicable to the embodiment of the present invention.

FIG. 14 illustrates a BS and a UE which are applicable to the present invention. If a wireless communication system includes a relay, communication in a backhaul link is performed between a BS and the relay and communication in an access link is performed between the relay and a UE.

Accordingly, the BS and UE shown in FIG. 14 may be replaced with the relay according to situation.

Referring to FIG. 14, a wireless communication system includes a BS 110 and a UE 120. The BS 110 includes a processor 112, a memory 114, and a Radio Frequency (RF) unit 116. The processor 112 may be configured so as to implement the procedures and/or methods proposed in the present invention. The memory 114 is connected to the processor 112 and stores various pieces of information related to operations of the processor 112. The RF unit 116 is connected to the processor 112 and transmits and/or receives RF signals. The UE 120 includes a processor 122, a memory 124, and an RF unit 126. The processor 122 may be configured so as to implement the procedures and/or methods proposed in the present invention. The memory 124 is connected to the processor 122 and stores various pieces of information related to operations of the processor 122. The RF unit 126 is connected to the processor 122 and transmits and/or receives RF signals. The BS 110 and/or the UE 120 may have a single antenna or multiple antennas.

The embodiments of the present invention described hereinabove are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in the embodiments of the present invention may be rearranged. Some constructions of any one embodiment may be included in another embodiment and may be replaced with corresponding constructions of another embodiment. It is obvious that claims that are not explicitly cited in each other in the appended claims may be presented in combination as an embodiment of the present invention or included as a new claim by subsequent amendment after the application is filed.

In this document, the embodiments of the present invention have been described centering on a data transmission and reception relationship between a UE and a BS. In some cases, a specific operation described as performed by the BS may be performed by an upper node of the BS. Namely, it is apparent that, in a network comprised of a plurality of network nodes including a BS, various operations performed for communication with a UE may be performed by the BS, or network nodes other than the BS. The term BS may be replaced with the terms fixed station, Node B, eNode B (eNB), access point, etc. The term UE may be replaced with the term Mobile Station (MS), Mobile Subscriber Station (MSS), etc.

The embodiments of the present invention may be achieved by various means, for example, hardware, firmware, software, or a combination thereof. In a hardware configuration, the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

The present invention may be used for wireless communication devices such as a UE, a relay, and a BS.

What is claimed is:

1. A method for receiving ACK/NACK (Acknowledge/Negative ACK) information at a base station in a wireless communication system, the method comprising:
    configuring a plurality of carriers for downlink signal transmission;
    transmitting downlink signals including a semi-persistent scheduled downlink signal through the plurality of carriers; and
    receiving an ACK/NACK payload for the plurality of carriers, the ACK/NACK payload including a plurality of concatenated ACK/NACK sets, wherein each ACK/NACK set is associated with a respective one of the plurality of carriers and has one or more ACK/NACK bits,
    wherein the ACK/NACK payload includes an ACK/NACK bit for the semi-persistent scheduled downlink signal, and the ACK/NACK bit for the semi-persistent scheduled downlink signal is positioned at an end of a corresponding ACK/NACK set.

2. The method of claim 1, wherein the ACK/NACK bit for the semi-persistent scheduled downlink signal is not positioned at an end of the ACK/NACK payload.

3. The method of claim 1, wherein the ACK/NACK set including the ACK/NACK bit for the semi-persistent scheduled downlink signal further includes one or more ACK/NACK bits for one or more dynamic scheduled downlink signals.

4. The method of claim 1, wherein the ACK/NACK payload for the plurality of carriers is received through a PUCCH (Physical Uplink Control Channel) or PUSCH (Physical Uplink Shared Channel).

5. The method of claim 1, wherein a size of the ACK/NACK payload is given based on a carrier configuration, the carrier configuration including a number of configured carriers and transmission modes for the configured carriers.

6. The method of claim 1, wherein the plurality of concatenated ACK/NACK sets are arranged in an order of a carrier index.

7. The method of claim 1, wherein an ACK/NACK bit position for a downlink signal in a corresponding ACK/NACK set is indicated by ordering information in a PDCCH (Physical Downlink Control Channel) signal corresponding to the downlink signal.

8. The method of claim 1, wherein for the semi-persistent scheduled downlink signal, the corresponding ACK/NACK set is an ACK/NACK set associated with a carrier on which the semi-persistent scheduled downlink signal is received.

9. A base station for use in a wireless communication system, the base station comprising:
    a radio Frequency unit; and
    a processor configured to:
        configure a plurality of carriers for downlink signal transmission, transmit downlink signals including a semi-persistent scheduled downlink signal through the plurality of carriers, receive an ACK/NACK (Acknowledge/Negative ACK) payload for the plurality of carriers, the ACK/NACK payload including a plurality of concatenated ACK/NACK sets, wherein each ACK/NACK set is associated with a respective one of the plurality of carriers and have one or more ACK/NACK bits, wherein the ACK/NACK payload includes an ACK/NACK bit for the semi-persistent scheduled downlink signal, and the ACK/NACK bit for the semi-persistent scheduled downlink signal is positioned at an end of a corresponding ACK/NACK set.

10. The base station of claim 9, wherein the ACK/NACK bit for the semi-persistent scheduled downlink signal is not positioned at an end of the ACK/NACK payload.

11. The base station of claim 9, wherein the ACK/NACK set including the ACK/NACK bit for the semi-persistent scheduled downlink signal further includes one or more ACK/NACK bits for one or more dynamic scheduled downlink signals.

12. The base station of claim 9, wherein the ACK/NACK payload for the plurality of carriers is received through a PUCCH (Physical Uplink Control Channel) or PUSCH (Physical Uplink Shared Channel).

13. The base station of claim 9, wherein a size of the ACK/NACK payload is given based on a carrier configuration, the carrier configuration including a number of configured carriers and transmission modes for the configured carriers.

14. The base station of claim 9, wherein the two or more concatenated ACK/NACK sets are arranged in an order of a carrier index.

15. The base station of claim 9, wherein an ACK/NACK bit position for a downlink signal in a corresponding ACK/NACK set is indicated by ordering information in a PDCCH (Physical Downlink Control Channel) signal corresponding to the downlink signal.

16. The base station of claim 9, wherein for the semi-persistent scheduled downlink signal, the corresponding ACK/NACK set is an ACK/NACK set associated with a carrier on which the semi-persistent scheduled downlink signal is received.

* * * * *